(12) United States Patent
Koukan et al.

(10) Patent No.: US 9,434,247 B2
(45) Date of Patent: Sep. 6, 2016

(54) FUEL TANK FOR A MOTOR VEHICLE

(75) Inventors: Ibrahim Koukan, Cologne (DE); Lothar Maigre, Sankit Augustin (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 391 days.

(21) Appl. No.: 13/811,501

(22) PCT Filed: Jun. 24, 2011

(86) PCT No.: PCT/EP2011/003139
§ 371 (c)(1),
(2), (4) Date: Apr. 11, 2013

(87) PCT Pub. No.: WO2012/010247
PCT Pub. Date: Jan. 26, 2012

(65) Prior Publication Data
US 2013/0277371 A1    Oct. 24, 2013

(30) Foreign Application Priority Data

Jul. 19, 2010   (DE) .......................... 10 2010 027 653
Dec. 9, 2010    (DE) .......................... 10 2010 053 994

(51) Int. Cl.
*B60K 15/04*       (2006.01)
*B60K 15/035*      (2006.01)

(52) U.S. Cl.
CPC ......... *B60K 15/04* (2013.01); *B60K 15/03519* (2013.01)

(58) Field of Classification Search
CPC .................. B60K 2015/03576; B60K 15/04; B60K 15/03519

USPC ........... 220/562, 563, 564, 86.1, 86.2, 86.3, 220/746, 749; 137/588, 58
See application file for complete search history.

(56) References Cited

U.S. PATENT DOCUMENTS 3,800,978 A  *  4/1974  Sigwald ........................ 220/746
3,968,896 A  *  7/1976  Giacoletti et al. .............. 73/306
3,979,010 A  *  9/1976  Fiedler et al. ................ 220/86.2
(Continued)

FOREIGN PATENT DOCUMENTS

DE      2223205 A1    11/1973
EP      1068980 A2    1/2001
(Continued)

OTHER PUBLICATIONS

English translation of Japanese Office Action/Notification of Reasons for Refusal mailed Jan. 21, 2014, received in related Japanese Application No. JP2013-519981, 4 pages.
(Continued)

*Primary Examiner* — Fenn Mathew
*Assistant Examiner* — Don M Anderson
(74) *Attorney, Agent, or Firm* — Grossman Tucker Perreault & Pfleger, PLLC

(57) ABSTRACT

The invention relates to a fuel tank (1) for a motor vehicle with at least one filler pipe (3) which extends partially outside the filling volume (5) of the fuel tank (1), with at least one refuelling venting path from a refuelling venting device (10) to a fuel vapor filter (9), and with at least one operational venting path to the fuel vapor filter (9). The fuel tank (1) comprises at least one operational venting line (14) which is attached to the filler pipe (3) inside the filling volume of the fuel tank (1).

12 Claims, 1 Drawing Sheet

(56) References Cited

U.S. PATENT DOCUMENTS

| | | | |
|---|---|---|---|
| 4,142,647 A * | 3/1979 | Walters | B60K 15/03504 |
| | | | 137/587 |
| 4,152,639 A | 5/1979 | Chaffee | |
| 4,457,443 A * | 7/1984 | Casimir et al. | 220/746 |
| 4,531,653 A * | 7/1985 | Sakata | 220/746 |
| 4,676,517 A * | 6/1987 | Tamura | 280/834 |
| 4,700,864 A * | 10/1987 | Galles et al. | 220/86.2 |
| 4,742,809 A * | 5/1988 | Ito et al. | 123/519 |
| 4,799,509 A * | 1/1989 | Wawra et al. | 137/587 |
| 4,815,436 A * | 3/1989 | Sasaki et al. | 123/520 |
| 4,934,417 A * | 6/1990 | Bucci | 141/1 |
| 5,131,439 A * | 7/1992 | Bucci | 141/59 |
| 5,215,132 A * | 6/1993 | Kobayashi | 141/302 |
| 5,282,497 A * | 2/1994 | Allison | 141/59 |
| 5,343,902 A * | 9/1994 | Ramioulle | 141/7 |
| 5,343,905 A * | 9/1994 | Gryc et al. | 141/59 |
| 5,404,906 A * | 4/1995 | Aoshima | B60K 15/03504 |
| | | | 123/519 |
| 5,775,392 A * | 7/1998 | Kraft | 141/382 |
| 6,006,799 A * | 12/1999 | Kraft et al. | 141/59 |
| 6,260,544 B1 * | 7/2001 | Spry et al. | 123/516 |
| 6,732,759 B2 * | 5/2004 | Romanek et al. | 137/588 |
| 7,152,639 B2 | 12/2006 | Aschoff | |
| 7,448,367 B1 | 11/2008 | Reddy et al. | |
| 8,485,386 B2 * | 7/2013 | Koukan et al. | 220/562 |
| 2002/0125254 A1 * | 9/2002 | Hagano et al. | 220/562 |
| 2002/0157715 A1 * | 10/2002 | Viebahn | 137/588 |
| 2003/0015536 A1 * | 1/2003 | Tekulve et al. | 220/562 |
| 2003/0057213 A1 * | 3/2003 | Souma et al. | 220/562 |
| 2006/0032663 A1 * | 2/2006 | Hosoya | 174/151 |
| 2006/0113309 A1 * | 6/2006 | Zdroik et al. | 220/562 |
| 2008/0142111 A1 * | 6/2008 | Osterbrink et al. | 141/59 |
| 2008/0302805 A1 * | 12/2008 | Komorida et al. | 220/562 |
| 2010/0230415 A1 * | 9/2010 | Eulitz | 220/562 |

FOREIGN PATENT DOCUMENTS

| | | |
|---|---|---|
| FR | 2581597 A1 | 11/1986 |
| JP | S603118 U | 1/1985 |
| JP | S62165397 U | 10/1987 |
| JP | S62192013 U | 12/1987 |
| JP | H0664454 A | 3/1994 |

OTHER PUBLICATIONS

PCT International Search Report and Written Opinion mailed Mar. 5, 2012, received in corresponding PCT Application No. PCT/EP11/03139, 8 pgs.

English translation of Chinese Office Action dated Dec. 19, 2014, received in Chinese Application No. 201180030609.8, 6 pgs.

* cited by examiner

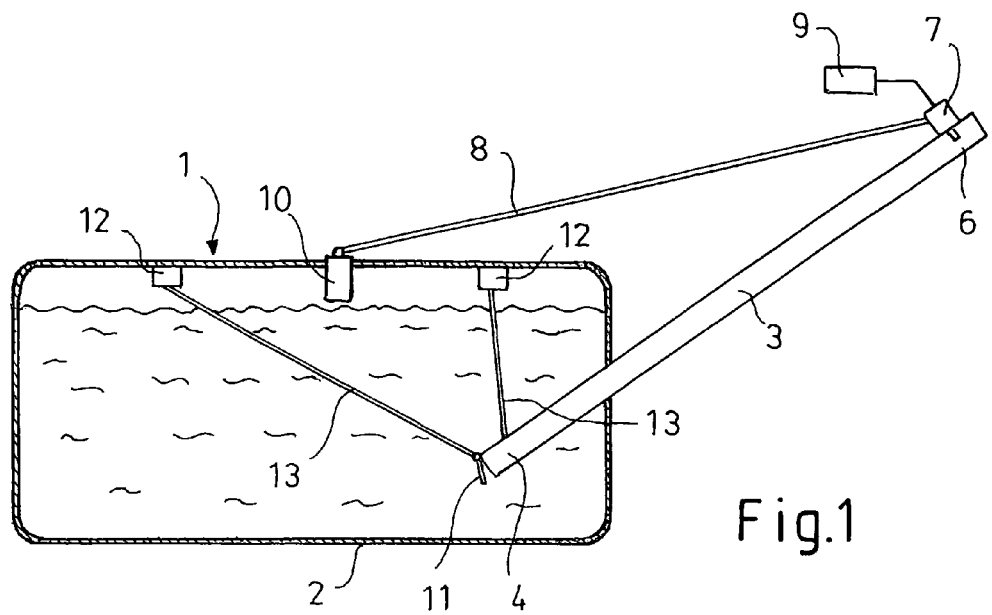
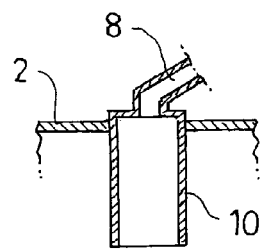 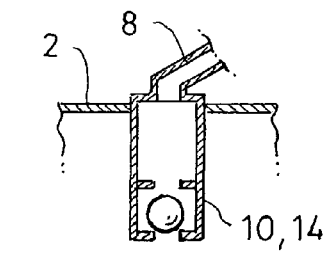
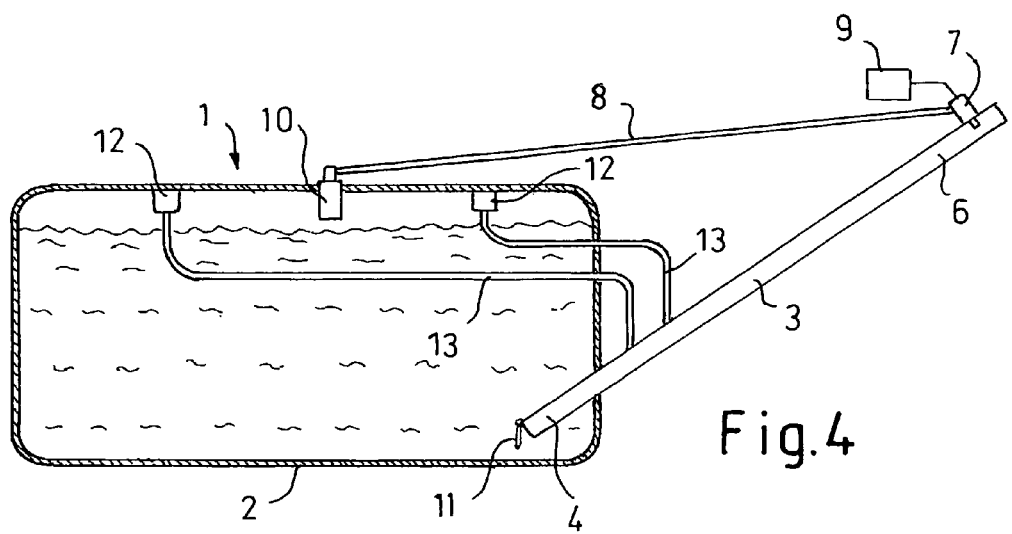

FUEL TANK FOR A MOTOR VEHICLE

The invention relates to a fuel tank for a motor vehicle. Generally, such tanks are provided with means for aerating and venting, both when refuelling and when operating the motor vehicle. During operation of the motor vehicle, fuel vapour (hydrocarbons in the gas phase) develops in the fuel tank, produced by the driving dynamics of the motor vehicle and/or by temperature fluctuations, said fuel vapour having to be discharged at least partially from the tank. This generally takes place via a fuel vapour filter which is designed as an activated charcoal filter.

When refuelling the motor vehicle, the volume of gas displaced by the volumetric flow of fuel which has been filled into the tank also has to be discharged. This volumetric flow of gas is cleaned via an activated charcoal filter and discharged to the atmosphere or drawn into the nozzle region of the dispensing nozzle. Depending on the geometry of the fuel tank, at least one or more venting points are provided on the tank. Generally, an operational venting valve is provided in a partial volume of the fuel tank above the maximum fluid level. Additionally, at least one refuelling venting valve is provided in the tank which blocks a refuelling venting path to the fuel vapour filter in the case of a rising fluid level in the fuel tank. In this case, due to the fluid flowing-in, gas is not able to be displaced from the tank, so that the fluid level in the filler pipe of the fuel tank rises until said fluid level closes a so-called blowhole of a dispensing nozzle inserted into the filler pipe and causes the dispensing nozzle to be switched off.

In a fuel tank which has been filled to a maximum level, a compensation volume should remain in any case above the fluid level in the fuel tank, which ensures that no liquid hydrocarbons reach the venting lines and which permits an expansion of the fuel in the event of a rise in temperature. Due to these circumstances, operational venting valves, which are provided in the fuel tank in the normal position of the fuel tank, are provided above one or more refuelling venting valves/fuel level limiting valves. So that the compensation volume remains free during refuelling, and an actuation of the refuelling venting valve is possible as a result of the filling level, operational venting valves generally have to be provided with a pressure maintaining function, i.e. designed so that they permit an operational venting of the fuel tank only when a specific tank internal pressure is exceeded. To ensure this function, refuelling venting valves are generally provided in the fuel tank, which at the same time are configured as so-called roll-over valves which close the refuelling venting lines when the motor vehicle rolls over or in an upturned position of the motor vehicle caused by other reasons.

In principle, valves and other movable components, in particular when said components are made of plastics material and are subjected permanently to the hydrocarbon atmosphere in the tank, are a potential source of problems. Moreover, it is complicated to fasten the components to the corresponding points of the tank wall. The tank wall generally consists of a HDPE thermoplastic material, which is only partially resistant to hydrocarbons. Valves and other movable components made of plastics material are generally made of other materials which do not swell up in the presence of hydrocarbons, but which are not compatible with the tank wall in the sense of being able to be welded thereto. Therefore, it is relatively complicated to fasten refuelling venting valves to the tank wall in the interior of the fuel tank, in particular when the fuel tank is to be made in one piece in one production process with fittings to be incorporated therein.

It is, therefore, the object of the invention to optimize a fuel tank of the aforementioned type with regard to the required movable fittings.

At the same time, such a fuel tank is intended to permit the refuelling process to be reliably switched off and to provide effective protection against over-filling.

The object of the invention is achieved by a fuel tank for a motor vehicle with at least one filler pipe which extends at least partially outside the filling volume of the tank, with at least one refuelling venting path from a refuelling venting device to a fuel vapour filter and with at least one operational venting path to the fuel vapour filter, comprising at least one operational venting line, the fuel tank according to the invention being characterized in that the operational venting line, relative to the installed position of the fuel tank, is attached to the filler pipe below the maximum possible fluid level in the filler pipe as dictated by the design of the tank. The maximum fluid level in the filler pipe, as predetermined by the design, is the fluid level at which the dispensing nozzle is switched off, and namely during normal refuelling. Cases of the fuel tank being forcibly overfilled, so that liquid fuel fills up the compensation volume provided in the fuel tank, are excluded.

This relatively simple solution according to the invention makes it possible to be able to dispense with the pressure maintaining function of refuelling venting valves in the conventional sense.

The protection against overfuelling is ensured as the hydrostatic pressure of the fluid column present in the filler pipe after refuelling, when the dispensing nozzle is switched off, takes on this pressure maintaining function which is otherwise provided by the valves. Overfilling is not possible in this case, as one or more refuelling venting paths are blocked by the fluid level present in the filler pipe.

In this solution, the filler pipe is expediently part of the operational venting path and, due to the relatively large cross section and its alignment in the normal position/installed position of the fuel tank, serves as a liquid trap for so-called liquid carry-over. By "liquid carry-over" is understood liquid hydrocarbon particles entrained during the venting of the motor vehicle during operation due to the driving dynamics. By increasing the cross section in the filler pipe and the associated slowing-down of the venting flow, effective drainage is additionally effected of the liquid carry-over which is passed back into the tank volume.

The operational venting line, relative to the installed position of the fuel tank, may be attached to the filler pipe in a region which extends below the maximum possible liquid level in the fuel tank, up to approximately 20 cm above the liquid level in the fuel tank. The terms "below" and "above" in the sense of the invention refer to the so-called geodetic height difference relative to the horizontal fluid level in the tank.

By the choice of a suitable attachment point inside the above-mentioned region, the level of the excess pressure which is able to be maintained in the tank may be adjusted. The pressure maintaining function is dependant on the height of the fuel column in the filler pipe closing the operational venting line.

The operational venting line may be attached to the filler pipe, for example outside the tank.

In an expedient and advantageous embodiment of the fuel tank, it is provided according to the invention that the filler pipe is attached to the fuel tank at floor level.

The operational venting line may, for example, be attached to the filler pipe in the region of the end outside the tank which faces the fuel tank. In other words, one or more operational venting lines may be attached to the filler pipe of the fuel tank outside the volume enclosed by the fuel tank, and namely in a region of the filler pipe which extends substantially below the maximum filling level of the fuel tank. With a floor-level connection of the filler pipe to the fuel tank, the operational venting line connectors or at least one operational venting connector may be attached thereto in the region of the filler pipe which only extends to a negligible extent above the floor level of the fuel tank. In other words, one or more operational venting lines are able to discharge into the filler pipe immediately in the connection region of the filler pipe to the fuel tank.

In an alternative variant of the fuel tank according to the invention, it is provided that the operational venting line is attached to the filler pipe inside the tank.

In an expedient variant of the fuel tank, it is provided according to the invention that the operational venting line comprises at least one operational venting connector which, in the installed position of the fuel tank, discharges into the filling volume above the maximum tank filling level, in the normal position of the fuel tank the operational venting connector being open in an unpressurized state towards the filling volume of the tank. "Open in the unpressurized state" means that the operational venting connector may be configured as a simple open tube end or nipple, which may be fastened to the tank wall adjacent to the compensation volume of the fuel tank. Such a fastening is relatively easy to implement and does not require any fastening holders/fastening supports as are required in valves.

In a preferred variant of the fuel tank, it is provided according to the invention that the operational venting line is attached to the outlet end of the filler pipe. The operational venting line may be configured as a collective venting line which communicates with a plurality of operational venting connectors provided in the fuel tank in different partial volumes.

The fuel tank according to the invention may, for example, be configured as an HDPE plastics fuel tank.

In a preferred variant of the fuel tank, according to the invention at least one operational venting connector is configured as a line end which is open towards the filling volume. This could have been bonded or welded, for example, to the tank wall in the region of the compensation volume to be provided. Alternatively, the line and the open line end may be snap-fitted.

In an expedient embodiment of the fuel tank, it is provided according to the invention that the filler pipe inside the tank is provided with a closure device, preferably with a non-return valve and the operational venting line is attached to the filler pipe upstream of the closure device in the direction of flow of the fuel flowing into the tank.

For example, in the known manner a refuelling venting valve with flash-over protection may be provided as a refuelling venting device. Alternatively, the refuelling may also be cut off by means of the open line end/immersion tube/nipple. In this case, for example, a roll-over valve may be provided on a changeover device provided on the filler pipe/filler head. Such a changeover valve opens up the refuelling venting path to the fuel vapour filter when a dispensing nozzle is inserted into the filler pipe and blocks said refuelling venting path when the dispensing nozzle is removed from the filler pipe.

The invention is explained hereinafter with reference to an exemplary embodiment shown in the drawings, in which:

FIG. 1 shows a schematic view of a fuel tank according to the invention,

FIG. 2 shows a schematic view of a refuelling venting device on the fuel tank shown in FIG. 1, FIG. 3 shows an alternative embodiment of the refuelling venting device of the fuel tank, and FIG. 4 shows an alternative embodiment of the fuel tank according to the invention.

FIG. 1 shows schematically, and in a very simplified manner, a fuel tank 1 according to the invention which is configured as a plastics fuel tank. Said fuel tank has been made, for example, by extrusion blow-moulding from HDPE thermoplastics material. The tank wall 2 of the fuel tank consists of a six-layer co-extrudate with outer layers made of HDPE, an inner layer made of EVOH as a barrier layer for hydrocarbons and at least two LDPE layers of bonding agent incorporating the barrier layer.

The fuel tank 1 according to the invention comprises in the conventional manner a filler pipe 3 which penetrates the tank wall 2 and in the disclosed exemplary embodiment is designed for so-called refuelling at floor level, i.e. extends with its outlet end 4 into the filling volume 5 of the fuel tank 1 so that the fuel flows into the fuel tank 1 at floor level when refuelling. Within the scope of the invention, naturally refuelling above floor level may also be provided. The outlet end 4 of the filler pipe 3 is provided with a non-return valve 11 which is intended to prevent the so-called spitback effect, i.e. a back-surge into the filler pipe 3 when refuelling. Part of the filler pipe 3 extends in the known manner outside the filling volume 5 and the fuel tank 1. At the inlet end 6 of the filler pipe 3, in the known manner, a filler head is provided with the filling nozzle and lead-free flap or the like. In the region of the inlet end 6 of the filler pipe 3, additionally a changeover valve 7 is provided via which a refuelling venting line 8 is guided to a fuel vapour filter 9. The outlet end 4 of the filler pipe is also denoted as the filling nozzle and does not necessarily have to be configured integrally with the filler pipe 3.

The refuelling venting line 8 which is routed outside the fuel tank 1, discharges therein into a refuelling venting device 10. At 12 are denoted two operational venting connectors which are open in an unpressurized state towards the filling volume 5 of the fuel tank 1 in the normal position of the fuel tank 1 shown. The operational venting connectors 12 are connected to the filler pipe 3 via operational venting lines 13 at the outlet end 4 of the filler pipe 3 in the flow direction of the fuel to be filled into the tank, directly upstream of the non-return valve 11, so that over a large part of its length the filler pipe 3 is part of the refuelling venting path.

The operational venting connectors 12 and the refuelling venting device 10, according to a variant of the fuel tank according to the invention, are configured as open line ends communicating with the filling volume 5 of the tank. In FIG. 2, for example, the refuelling venting device 10 is shown enlarged and is configured as an immersion pipe which is open towards the filling volume 5 of the fuel tank 1. In this case, a roll-over valve is incorporated in the changeover valve 7.

In the variant shown in FIG. 3 of the refuelling venting device 10, said refuelling venting device is configured as a refuelling venting valve 14 with a roll-over function.

When refuelling the fuel tank 1, fuel flows through the filler pipe 3 into the fuel tank 1 until the liquid level reaches the refuelling venting device 10 and closes the refuelling venting line 8. Then the pressure in the fuel tank rises slowly. As a result, the liquid level in the filler pipe 3 rises until said liquid level reaches a blowhole of a dispensing nozzle inserted in the filler pipe 3 and switches off the dispensing nozzle. As long as the dispensing nozzle is inserted into the filler pipe 3, said dispensing nozzle actuates the changeover valve 7 which opens up the path from the refuelling venting line 8 to the fuel vapour filter 9. When the maximum filling level is reached in the fuel tank 1 and in the filler pipe 3, the liquid column present in the filler pipe 3 acts as a seal for the operational venting lines 13.

After the completion of the refuelling process, a removal of the dispensing nozzle causes an actuation of the changeover valve 7 such that the path from the filler pipe 3 to the fuel vapour filter 9 is opened up, the path from the refuelling venting line 8 to the fuel vapour filter 9, however, is blocked.

The fuel level in the filler pipe 3 is comparatively briefly reduced after refuelling so that the path from the operational venting connectors 12 via the operational venting lines 13 to the fuel vapour filter 9 is opened up. In this case, during operation of the motor vehicle, the filler pipe 3, due to its large cross section, in turn acts as a liquid trap for hydrocarbon droplets which could be entrained as so-called liquid carry-over to the fuel vapour filter 9. In this case, in particular, the slowing-down of the flow velocity in the filler pipe 3 is noticeable, due to the relatively large cross section thereof.

FIG. 4 shows schematically, in a very simplified manner, a fuel tank 1 according to a second exemplary embodiment of the invention. The same components are provided in this exemplary embodiment with the same reference numerals.

The exemplary embodiment shown in FIG. 4 of the fuel tank 1 according to the invention differs from the exemplary embodiment shown in FIG. 1, in that the operational venting lines 13 are attached to the filler pipe 3 outside the filling volume 5 of the fuel tank 1, and namely in the immediate vicinity of the tank wall 2, in the region in which the filler pipe 3 extends substantially below the maximum liquid level in the fuel tank 1. In this case, the mode of operation of the operational venting is ensured as in the exemplary embodiment shown in FIG. 1.

LIST OF REFERENCE NUMERALS

1 Fuel tank
2 Tank wall
3 Filler pipe
4 Outlet end of filler pipe
5 Filling volume
6 Inlet end of filler pipe
7 Changeover valve
8 Refuelling venting line
9 Fuel vapour filter
10 Refuelling venting device
11 Non-return valve
12 Operational venting connectors
13 Operational venting lines
14 Refuelling venting valve

What is claimed is:

1. Fuel tank for a motor vehicle comprising:
    at least one filler pipe which extends at least partially outside the filling volume of the tank, with at least one refuelling venting path from a refuelling venting device to a fuel vapour filter; and
    at least one operational venting path to the fuel vapour filter, comprising at least one operational venting line, wherein the operational venting line, relative to the installed position of the fuel tank, is attached to the filler pipe below a maximum possible liquid level in the filler pipe as dictated by the design of the tank.

2. Fuel tank according to claim 1, characterized in that the operational venting line, relative to the installed position of the fuel tank, is attached to the filler pipe in a region below the maximum possible liquid level up to approximately 20 cm above the maximum possible liquid level in the fuel tank.

3. Fuel tank according to claim 1, characterized in that the operational venting line is attached to the filler pipe outside the filling volume.

4. Fuel tank according to claim 1, characterized in that the filler pipe is attached to the fuel tank at floor level.

5. Fuel tank according to claim 1, characterized in that the operational venting line is attached to the filler pipe in the region of the end which faces the fuel tank.

6. Fuel tank according to claim 1, characterized in that the operational venting line is attached to the filler pipe inside the tank.

7. Fuel tank according to claim 6, characterized in that the operational venting line comprises at least one operational venting connector which in the installed position of the fuel tank discharges into the filling volume above the maximum tank filling level, in the normal position of the fuel tank the operational venting connector being open in an unpressurized state towards the filling volume of the tank.

8. Fuel tank according to claim 6, characterized in that the operational venting line is attached to the outlet end of the filler pipe.

9. Fuel tank according to claim 1, characterized in that an operational venting connector is configured as a line end which is open towards the filling volume.

10. Fuel tank according to claim 1, characterized in that the filler pipe inside the tank is provided with a closure device, preferably with a non-return valve, and in that the operational venting line is attached to the filler pipe upstream of the closure device in the direction of flow of the fuel flowing into the tank.

11. Fuel tank according to claim 1, characterized in that the at least one operational venting path extends in series from the operational venting line to the filler pipe to the fuel vapour filter.

12. Fuel tank according to claim 1, characterized in that the at least one operational venting path is arranged such that, during operational venting, fuel vapour flows from the operational venting line into the filler pipe in a direction towards an inlet end of the filler pipe before reaching the fuel vapour filter.

\* \* \* \* \*